United States Patent [19]

Baker

[11] 4,325,658

[45] Apr. 20, 1982

[54] SILICATE COMPOSITIONS AND USE THEREOF

[75] Inventor: Brian Baker, Middlesbrough, England

[73] Assignee: Imperial Chemical Industries Limited, London, England

[21] Appl. No.: 96,301

[22] Filed: Nov. 21, 1979

[30] Foreign Application Priority Data

Nov. 30, 1978 [GB] United Kingdom ............... 46639/78

[51] Int. Cl.³ .................... C09K 17/00; E02D 3/12; B28B 7/34; C08J 3/02
[52] U.S. Cl. .............................. 405/264; 106/38.35; 106/236; 252/316
[58] Field of Search ............... 252/316; 106/38.35, 106/236; 166/293; 405/264

[56] References Cited

U.S. PATENT DOCUMENTS

| | | | |
|---|---|---|---|
| 2,061,509 | 11/1936 | De Laney | 106/236 |
| 2,448,624 | 9/1948 | Rummelsburg | 164/12 |
| 3,012,405 | 12/1961 | Caron | 166/293 X |
| 3,558,506 | 1/1971 | Bonnel et al. | 252/316 |
| 3,705,107 | 12/1972 | Hoeppel | 252/316 |
| 4,072,019 | 2/1978 | Pearson | 405/264 |

FOREIGN PATENT DOCUMENTS

| | | | |
|---|---|---|---|
| 168174 | 9/1921 | United Kingdom | 106/236 |
| 1122308 | 8/1968 | United Kingdom | 405/264 |
| 1159400 | 7/1969 | United Kingdom | 405/270 |
| 1352997 | 5/1974 | United Kingdom | 405/264 |
| 1359433 | 7/1974 | United Kingdom | 405/270 |

OTHER PUBLICATIONS

"Surface Active Agents and Detergents", vol. II, Publ. by Wiley Interscience, 1958, pp. 32, 33, 100 and 829.
Abstract of JP-A-7309332, Derwent Japanese Patents Report, vol. U, No. 13, May 1, 1973, Section L, p. 1.
McCutcheon's Detergents & Emulsifiers, 1973, No. American Edition, Publ. by McCutcheon's Division, Allured Publ. Corp., pp. 51 and 52.

Primary Examiner—Richard D. Lovering
Attorney, Agent, or Firm—Cushman, Darby & Cushman

[57] ABSTRACT

A gelling composition useful for soil stabilization comprises water, an alkali metal silicate, an ester, particularly an alkyl alkanoate or one or more diesters of a $C_2$ to $C_{10}$ dibasic alkanoic acid, and rosin or a rosin ester or salt or a rosin acid or rosin acid ester or salt.

9 Claims, No Drawings

SILICATE COMPOSITIONS AND USE THEREOF

The present invention relates to an alkali metal silicate solution which is capable of forming a silica gel and to the use of such a solution in the stabilisation of the ground and similar applications.

Alkali metal silicate solutions may be converted to silica gels by the addition of a number of agents such as amides, acids, alcohols and esters. This property is put to good use in the stabilisation of unstable ground for building purposes by injecting into the ground a mixture of silicate solution and gelling agent which gels through the silicic acid to form a rigid silica gel. For this use esters are particularly valuable gelling agents because the gelling only takes place when the ester hydrolyses so there is an initial delay while hydrolysis takes place and this delay enables the silicate solution containing the gelling agent to be injected into the ground before gelling and subsequent hardening commences.

Among the esters which are commonly employed as gelling agents for silicate solutions are included alkyl alkanoates particularly esters of $C_1$ to $C_6$ monobasic alkanoic acids with $C_1$ to $C_5$ alkanols e.g. ethyl acetate, isopropylacetate and methyl propionate and the esters of dibasic alkanoic acids e.g. esters of oxalic, succinic, glutaric and adipic acids. These dibasic acid esters have a number of advantages as gelling agents e.g. their rates of hydrolysis are such as to provide the right gelling time for the silicate solutions under the commonly encountered ambient temperature conditions at which such solutions are used. We have found however that there is a tendency for esters, particularly dibasic acid esters to be only sparingly miscible with aqueous alkali metal silicate solutions so that phase separation may occur resulting in the injection of an inhomogeneous mixture into the ground which does not gel uniformly. We have however devised a composition which overcomes this difficulty and which we have found in addition to have superior gelling properties.

According to the invention a gelling composition comprises water, an alkali metal silicate, an ester and rosin or a rosin ester or salt or a rosin acid or a rosin acid ester or salt.

Preferably, the ester comprises one or more diesters of a $C_2$ to $C_{10}$ dibasic alkanoic acid.

The $C_2$ to $C_{10}$ dibasic alkanoic acids are oxalic, malonic, succinic, glutaric, adipic, pimelic, suberic, azelaic and sebacic acids and of these succinic, glutaric and adipic acids are preferred particularly as a mixture of two from the three e.g. glutaric and adipic acids, or all three together. The diester is preferably a diester of a $C_1$ to $C_5$ alkanol, particularly the dimethyl or diethyl ester or mixed methyl/ethyl ester.

Rosin is a naturally occurring product comprising predominantly a mixture of so-called rosin or resin acids and although for economic reasons it is preferred to use rosin itself or a rosin ester or salt one or more of the rosin acids or rosin acid esters or salts may be used i.e. an abietic type acid e.g. abietic, levopimaric, neoabietic or palustric acids, a pimaric type acid e.g. pimaric or an isopimaric acid, or elliotinoic acid or sandaracopimaric acid. The esters may suitably be esters of $C_1$ to $C_5$ alkanols e.g. a methyl or ethyl ester and the salts alkali metal e.g. sodium, alkaline earth metal e.g. calcium or other metal e.g. zinc or aluminum or amine salt. The rosin or rosin acid may also be modified by commercially known processes which are used to improve its properties. In particular the rosin or rosin acid may have been partially or completely hydrogenated or partially dehydrogenated, processes which are employed to increase the colour stability of the product.

The alkali metal silicate may be a sodium, potassium or lithium silicate or polysilicate more usually a sodium salt for economic reasons. The molar ratio of $SiO_2:M_2O$ where M is the alkali metal is preferably between 2.0 and 5.0. The relative amounts of the ingredients of the composition may vary widely but the preferred ranges are 10 to 50 wt % alkali metal silicate (as solid), 1 to 15 wt % ester, 0.01 to 10 wt %, preferably 0.02 to 5 wt %, of the rosin, rosin ester or salt, rosin acid or rosin acid ester or salt and the balance water.

Although the compositions according to the invention may be used in the stabilisation of the ground as described earlier in this specification this is by no means their only application and they may find use in other fields e.g. in foundry sand moulding compositions and in water-sealing fissures or voids in rock and sealing a surface where water impermeability rather than significant mechanical strength is required. In this latter application a more dilute silicate solution which sets to a "soft" gel may be used. The compositions according to the invention maintain a substantially phase stable liquid system for a sufficiently long time to enable the silicate solution to reach its point of application, although it will be appreciated that once the ingredients have been blended the composition must be used as soon as possible otherwise significant gelling will take place before the solution is in the region where the stabilisation is required. In practice it is easier first to dissolve the rosin, rosin ester or salt, rosin acid or rosin acid ester or salt in the ester rather than to add it directly to the silicate solution because by so doing the additive is more rapidly dispersed in the silicate solution.

The invention will now be further illustrated by reference to the following Examples.

EXAMPLES 1–18

A solution was made up consisting of 60 mls of a sodium silicate solution (containing 39.3% solids $SiO_2$:$Na_2O$ molar ratio 3:3), 30 mls water and 10 mls of a gelling agent mixture which consisted in turn of 0.2 wt % dimethylsuccinate, 75.7 wt % dimethylglutarate and 24.1 wt % dimethyladipate.

Varying amounts of rosin, methylrosinate or ethylrosinate were added to samples of the solution and each sample tested by charging to a stoppered 100 ml measuring cylinder and inverting the cylinder 70 times over a period of 30 seconds. The volume of gelling agent (diesters) which had separated from the solution was noted every five minutes starting from the first inversion of the cylinder.

For comparative purposes a number of other tests were carried out as shown in the following Table as Examples 7 to 18. In these tests a wide range of emulsifying agents were evaluated which might have been expected to improve the miscibility of the diester gelling agent with the silicate solution.

It can be seen from the Table that there is less separation of the dimethylesters when rosin or a rosin ester is present than in the absence of such an additive or in the presence of a standard emulsifying agent. In addition, the solution containing the rosin or rosin ester starts to gel sooner than the comparative solutions and the gelling is consistent throughout the solution rather than taking place in a localised manner at one or more points.

In practice consistent gelling throughout the silicate solution is important when it is realised that mixing after injection into the ground is usually impossible.

| Example | Additive | Concentration | % of gelling agent separated in time (mins) | | | | | | | |
|---|---|---|---|---|---|---|---|---|---|---|
| | | | 5 | 10 | 15 | 20 | 25 | 30 | 35 | 40 |
| 1 | — | — | 20 | 50 | 70 | 80 | 82 | 85 | 88 | local gelling |
| 2 | Rosin | 1% wt/vol | 0 | 10 | 20 | 30 | 35 | gelling throughout | | |
| 3 | Ethyl rosinate soln.* | 1% vol/vol | 0 | 10 | 20 | 30 | 45 | | | " |
| 4 | Ethyl rosinate soln.* | 2% vol/vol | 0 | 10 | 15 | 25 | 30 | | | " |
| 5 | Ethyl rosinate soln.* | 3% vol/vol | 0 | 0 | 10 | 15 | 20 | | | " |
| 6 | Methyl rosinate soln.* | 3% vol/vol | 0 | 10 | 15 | 20 | | | | " |
| 7 | Nonyl phenol ethoxylate | 1% vol/vol | 10 | 30 | 45 | 50 | 62 | 68 | 75 | local gelling |
| 8 | $C_{13}$–$C_{15}$ alkanol ethoxylate | 1% vol/vol | 10 | 30 | 45 | 55 | 65 | 70 | 80 | " |
| 9 | Polypropylene glycol monomethyl ether | 1% vol/vol | 15 | 55 | 75 | 82 | 85 | 88 | 90 | " |
| 10 | Ethoxylated polypropylene glycol | 1% vol/vol | 4 | 20 | 45 | 60 | 70 | 75 | 80 | " |
| 11 | Silicone ethoxylate | 1% vol/vol | 10 | 28 | 43 | 50 | 65 | 70 | 75 | " |
| 12 | Ethoxylated phenol/formaldehyde resin | 1% vol/vol | 12 | 30 | 45 | 55 | 65 | 70 | 80 | " |
| 13 | Triethanolamine oleate | 1% vol/vol | 20 | 35 | 50 | 65 | 75 | 80 | 85 | " |
| 14 | Coco diethanolamide | 1% vol/vol | 15 | 30 | 45 | 65 | 75 | 80 | 85 | " |
| 15 | Dimethyl $C_{13}$–$C_{15}$ alkylamine | 1% vol/vol | 25 | 40 | 55 | 70 | 78 | 83 | 88 | " |
| 16 | Linear $C_{13}$ alkyl sulphate | 1% vol/vol | 30 | 60 | 70 | 75 | 78 | 80 | 83 | " |
| 17 | Dodecylbenzene sulphonate | 1% vol/vol | 28 | 50 | 63 | 70 | 75 | 80 | 85 | " |
| 18 | Sodium dodecyl benzene sulphonate | 1% vol/vol | 30 | 55 | 65 | 73 | 78 | 82 | 85 | " |

The additives referred to as ethyl and methyl rosinates were prepared by refluxing for three hours 25 grams rosin with 80 mls ethanol or methanol respectively and 1 gram of para-toluene sulphonic acid as esterification catalyst. The resulting solution of the ester was used in the experiments without refinement.

EXAMPLES 19 AND 20

In the following Examples the silicate solution which was used comprised 36%wt/wt solids with a $SiO_2$:$Na_2O$ weight ratio of 2.9:1. The hardener comprised a mixture of diesters of the following composition:

| | |
|---|---|
| dimethylsuccinate | 5% by weight |
| dimethylglutarate | 72% by weight |
| dimethyladipate | 23% by weight | and was used in 10% by volume concentration.

Four experiments (Examples 19 and 20) were carried out to determine the effect of rosin on the compressive strength of a grout made with the silicate solution. The base material was Chelford 50 sand which was used wet and into 5 parts of which was injected 1 part of the silicate solution to produce cylindrical samples 5 cm long with 5 cm diameter. After standing for 48 hours the unconfined compressive strength of the sample was measured on a tensometer. The results were as follows:

| EXAMPLE | Concentration of silicate solution in the grouting mixture % by vol | Unconfined compressive strength Kg/cm² | |
|---|---|---|---|
| | | 1% wt/wt rosin based on the hardener | No rosin |
| 19 | 60 | 28 | 13 |
| 20 | 70 | 37 | 24 |

I claim:
1. A gelling composition which comprises:
   (a) 10 to 50 wt% alkali metal silicate (as solid),
   (b) 1 to 15 wt% of an ester of $C_1$ to $C_6$ monobasic alkanoic acid with $C_1$ to $C_5$ alkanol or a diester of a $C_2$ to $C_{10}$ dibasic alkanoic acid with a $C_1$ to $C_5$ alkanol,
   (c) 0.01 to 10 wt% of rosin, a rosin ester or salt, or a rosin acid or a rosin acid ester or salt,
   (d) the balance of the composition being water.
2. A gelling composition according to claim 1 in which the diester comprises a diester of succinic, adipic or glutaric acid or a mixture of diesters of two of these three or all of these three acids.
3. A gelling composition according to claim 1 in which the rosin ester or rosin acid ester is the ester of a $C_1$ to $C_5$ alkanol.
4. A gelling composition according to claim 1 in which the rosin salt or rosin acid salt is an alkali metal salt, an alkaline earth metal salt, a zinc salt, an aluminum salt or an amine salt.
5. A gelling composition according to claim 1 in which the rosin or rosin acid has been modified by partial or complete hydrogenation or by partial dehydrogenation.
6. A gelling composition according to claim 1 in which the alkali metal silicate is a sodium silicate or polysilicate and the molar ratio of $SiO_2$:$Na_2O$ in the sodium silicate is in the range 2.0 to 5.0.
7. A gelling composition according to claim 1 which comprises:
   (a) 10 to 50 wt % sodium silicate (as solid) with a molar ratio $SiO_2$:$Na_2O$ in the range 2.0 to 5.0;
   (b) 1 to 15 wt % of ethyl acetate, isopropyl acetate or a mixture of the methyl and/or ethyl diesters of two or three acids selected from the group consisting of adipic, succinic and glutaric acids;
   (c) 0.01 to 10 wt % rosin or an ester of rosin with a $C_1$ to $C_5$ alkanol;
   (d) the balance of the composition being water.

8. A method of stabilising the ground or of sealing a surface or of forming a foundry sand mould by contacting the ground, surface or sand with a composition according to claim 7.

9. A mixture for use in forming a composition according to claim 7 which comprises a solution of rosin or an ester of rosin with a $C_1$ to $C_5$ alkanol in a mixture of the methyl and/or ethyl diesters of two or three acids selected from the group consisting of adipic, succinic and glutaric acids.

* * * * *